United States Patent
Childs

(10) Patent No.: US 6,518,770 B2
(45) Date of Patent: Feb. 11, 2003

(54) SYSTEM AND METHOD FOR MEASURING DYNAMIC LOADS IN A MAGNETIC BEARING

(75) Inventor: Dara W. Childs, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 09/858,275

(22) Filed: May 15, 2001

(65) Prior Publication Data

US 2002/0005724 A1 Jan. 17, 2002

Related U.S. Application Data

(60) Provisional application No. 60/204,503, filed on May 16, 2000.

(51) Int. Cl.[7] .......................... G01R 31/06; H02K 7/09; G02B 6/26
(52) U.S. Cl. ...................................................... 324/545
(58) Field of Search .............................. 324/545, 772, 324/96, 117 H; 310/68 B, 90.5; 73/862.49; 385/26; 356/81; 250/205

(56) References Cited

U.S. PATENT DOCUMENTS

| | | | |
|---|---|---|---|
| 4,142,408 A | 3/1979 | Riazuelo | 73/140 |
| 4,254,331 A | 3/1981 | Dorman et al. | 250/205 |
| 4,438,987 A | 3/1984 | Kapaan | 308/10 |
| 5,640,472 A | 6/1997 | Meinzer et al. | 385/26 |
| 5,841,529 A | 11/1998 | Sirkis et al. | 356/345 |
| 6,249,067 B1 * | 6/2001 | Schob et al. | 310/68 B |

OTHER PUBLICATIONS

PCT International Search Report dated Oct. 10, 2001, re International Application PCT/US01/16002 filed May 16, 2001 (Applicant's reference No. 017575.0675).

* cited by examiner

Primary Examiner—Christine Oda
Assistant Examiner—Kerveros James C.
(74) Attorney, Agent, or Firm—Baker Botts L.L.P.

(57) ABSTRACT

A system for measuring dynamic loads in a rotordynamic system having a rotor includes a magnetic bearing disposed around the rotor and having a plurality of magnets and at least one fiber optic strain gage associated with a pole of a respective magnet. The fiber optic strain gage is operable to detect a strain on the respective pole resulting from the dynamic loads. The detected strain is indicative of the dynamic loads.

26 Claims, 4 Drawing Sheets

SYSTEM AND METHOD FOR MEASURING DYNAMIC LOADS IN A MAGNETIC BEARING

RELATED APPLICATIONS

This application claims the benefit of Ser. No. 60/204,503, entitled " Measurement of Dynamic Loads in Magnetic Bearings via Fiber Optic Strain Gages," filed provisionally on May 16, 2000.

TECHNICAL FIELD OF THE INVENTION

This invention relates in general to the field of magnetic bearings and, more particularly, to a system and method for measuring dynamic loads in a magnetic bearing.

BACKGROUND OF THE INVENTION

Magnetic bearings are used in many industrial applications. Magnetic bearings are used increasingly to support rotating turbomachinery, spindles of machine tools, and other rotating shafts. Magnetic bearings use attraction forces from electromagnets to levitate a machine's rotor. Because magnetic bearings are inherently unstable, they use relative displacement sensors to assist in active control of the current supplied to the electromagnets to provide stability. In certain applications, such as machine tools for machining, accurate measurement of the dynamic forces developed by the bearing and acting on the rotor is important.

One method for measuring or estimating the dynamic forces developed by a magnetic bearing is to measure control currents supplied to the poles of the bearings. However, this approach results in an inadequate accuracy estimate of between 2% and 10% of the full-scale load capacity of the bearing.

Another method for measuring or estimating the dynamic forces is mounting the bearing on load cells that have conventional electrical strain gauges. However, this approach typically requires an unwanted modification of the machine support structure to accommodate the load cells. Also, a magnetic bearing's temperature normally increases after start-up. Hence, a conventional electrical strain gauge measures the strain induced by a temperature increase and typically requires calibration at operating temperatures. Piezoelectric load cells are a possible alternative for direct measurement of transient loading, but normally require an even more extensive modification of a machine's housing for installation. Additionally, piezoelectric load cells normally measure time-varying loads and do not measure the steady load applied by the bearing.

An additional method for measuring the dynamic forces developed by a magnetic bearing is that a Hall flux sensor can be installed at the face of the electromagnets to measure flux and infer forces. However, the gap between the face of the electromagnet and the rotor must be increased to accommodate the flux sensor. This results in a dramatic loss of load capacity.

SUMMARY OF THE INVENTION

In accordance with the present invention, a system and method for measuring dynamic loads in a magnetic bearing is disclosed.

In one embodiment of the present invention, a system for measuring dynamic loads in a rotordynamic system having a rotor includes a magnetic bearing disposed around the rotor and having a plurality of magnets and at least one fiber optic strain gage associated with a pole of a respective magnet. The fiber optic strain gage is operable to detect a strain on the respective pole resulting from the dynamic loads. The detected strain is indicative of the dynamic loads.

Some embodiments of the invention provide a number of technical advantages. Embodiments of the invention may include all, some, or none of these advantages. The design of magnetic bearings may be improved by measuring the actual dynamic forces created via fiber optic strain gages. Furthermore, these fiber optic strain gages are able to measure significantly lower levels of strain than conventional electrical strain gages. Furthermore, electromagnetic interference does not affect fiber optic strain gages. Fiber optic strain gages also have exceptional durability over a wide load range and a high tolerance for high temperatures. In addition, fiber optic strain gages can be efficiently installed in magnetic bearings without degrading the load capacity of magnetic bearings.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF EXAMPLE EMBODIMENTS OF THE INVENTION

Example embodiments of the present invention and their advantages are best understood by referring now to FIGS. 1 through 8 of the drawings, in which like numerals refer to like parts.

Figure 1:
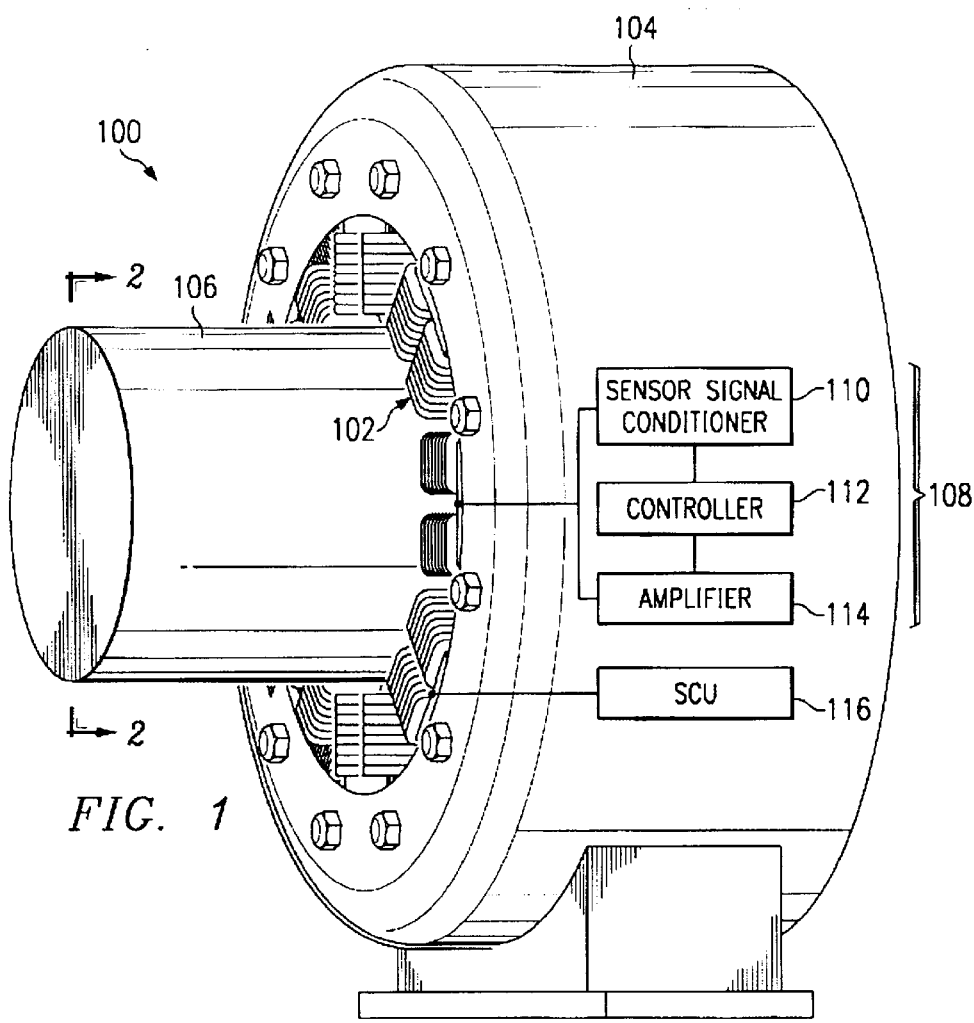
FIG. 1 illustrates is an elevation view, shown partially in perspective, of a portion of a rotordynamic system illustrating a magnetic bearing in a housing that is supporting a shaft according to one embodiment of the present invention.

FIG. 1 is an elevation view, shown partially in perspective, of a portion of a rotordynamic system 100 illustrating a magnetic bearing 102 in a housing 104 supporting a rotor 106. Rotordynamic system 100 is defined herein as any suitable dynamic system that has a rotor that rotates. For example, rotordynamic system 100 may be a pump, a compressor, a machine tool, or any other suitable rotating machinery. Magnetic bearing 102 is defined herein as any suitable bearing that uses electromagnetic forces to support a rotor.

FIG. 1 also shows a control system 108 that works in conjunction with magnetic bearing 102 to facilitate supporting and stabilizing rotor 106. In the illustrated embodiment, control system 108 includes a sensor signal conditioner 110, a controller 112, and an amplifier 114. However, control system 108 may be any suitable control system that controls the functioning of magnetic bearing 102. Because control systems for magnetic bearings are well known in the art of magnetic bearings, sensor signal conditioner 110, controller 112, and amplifier 114, are not described in detail.

Because electromagnetic forces are used to support rotor 106, it is often important to measure the static and dynamic forces applied to rotor 106 by magnetic bearing 102. Previous attempts at measuring the static and dynamic forces exerted by magnetic bearings have shown that there are adequate systems and methods for measuring the static loads, but inadequate systems and methods for measuring the dynamic loads. Therefore, according to the teachings of the present invention, one or more fiber optic strain gages 200 (not explicitly shown in FIG. 1) are used to measure the dynamic loads in rotordynamic system 100. In one embodiment, fiber optic strain gages 200 are coupled to signal conditioning unit 116. The details of the utilization of fiber optic strain gages 200 are described below in conjunction with FIGS. 2A through 5.

Figure 2A:
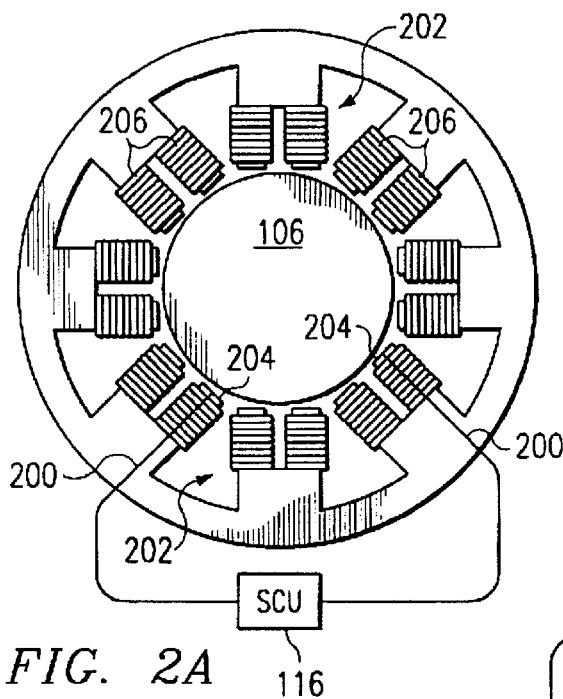
FIGS. 2A, 2B, and 2C are end elevation views of the rotordynamic system of FIG. 1 illustrating various positions of fiber optic strain gages coupled to poles of magnets of the magnetic bearing of FIG. 1.

Referring to FIG. 2A, magnetic bearing 102 has a plurality of magnets 202 that are disposed around rotor 106 for the purpose of supporting and stabilizing rotor 106. Each magnet 202 has two poles 204 that are used to supply the electromagnetic forces. To generate the electromagnetic forces, each pole is wrapped by an insulated conductive coil 206. Magnets 202 typically work in pairs along two or more axes of attraction, where one magnet 202 of the pair is disposed on one side of rotor 106 and the other magnet 202 of the pair is disposed on the other side of rotor 106, the magnets 202 being oriented approximately 180 degrees from one another with respect to rotor 106.

Figure 2B:
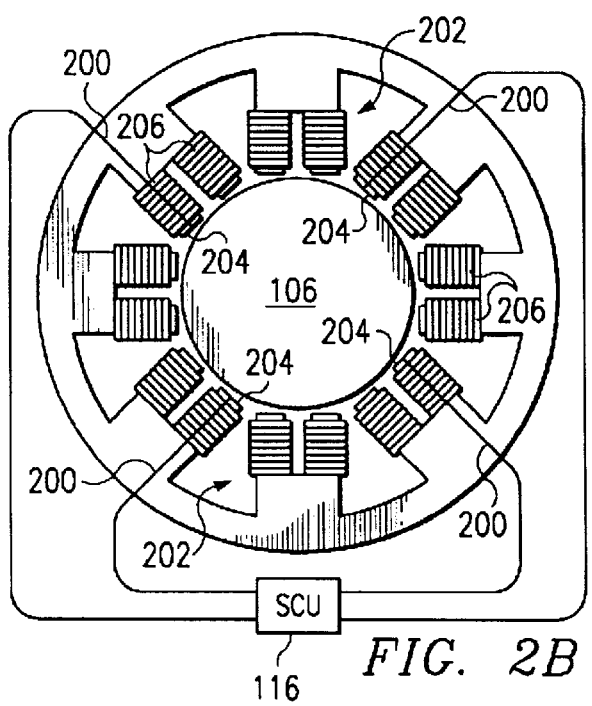
Figure 2C:
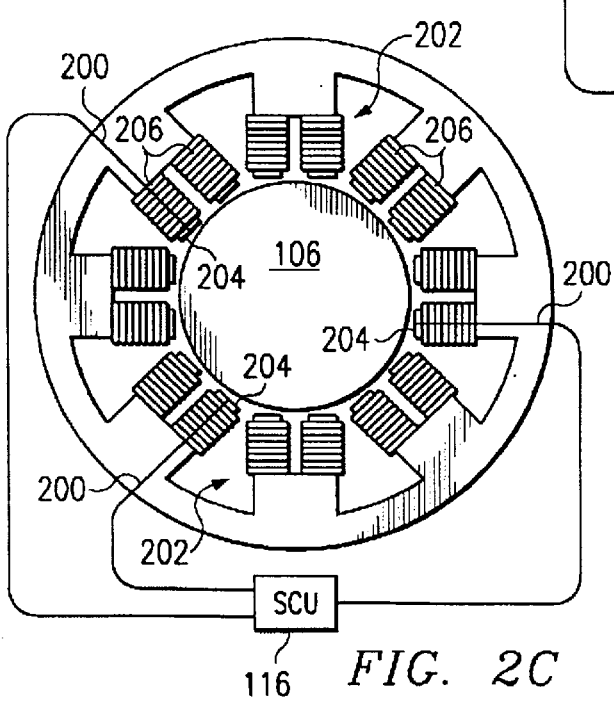

As mentioned above, fiber optic strain gages 200 are used to measure dynamic loads in rotor dynamic system 100. To facilitate this measuring, at least one fiber optic strain gage 200 is associated with at least one magnet 202. Example positions of fiber optic strain gages 200 are illustrated in FIGS. 2A, 2B, and 2C. The number and positions of fiber optic strain gages 200, however, may be different from those illustrated in FIGS. 2A, 2B, and 2C.

As illustrated in FIG. 2A, two fiber optic strain gages 200 are associated with respective poles 204 on two magnets 202. These two fiber optic strain gages 200 are oriented at approximately ninety degrees from one another with respect to rotor 106. As illustrated in FIG. 2B, four fiber optic strain gages 200 are associated with respective poles 204 on four magnets 202. These four fiber optic strain gages 200 are oriented at approximately ninety degrees from one another with respect to rotor 106. In this embodiment, the strains measured by the fiber optic strain gages 200 that are approximately 180 degrees apart may be averaged to arrive at the dynamic force applied by their respective magnets 202. As illustrated in FIG. 2C, three fiber optic strain gages 200 are associated with respective poles 204 on three magnets 202. These three fiber optic strain gages 200 are oriented at approximately 120 degrees from one another with respect to rotor 106.

To measure dynamic forces in rotordynamic system 100, one or more fiber optic strain gages 200 are coupled to signal conditioning unit 116 as illustrated in FIG. 2A. As described in more detail below in conjunction with FIG. 5, signal conditioning unit 116 receives signals from fiber optic strain gages 200 and converts these signals to a corresponding strain. This strain is indicative of the strain on the respective pole 204 that a particular fiber optic strain gage 200 is associated with. The measured strain is then converted to a force measurement in any suitable manner, which is indicative of the force that the respective magnet 202 is exerting on rotor 106. Different methods of associating fiber optic strain gages 200 with respective poles 204 are illustrated below in conjunction with FIGS. 3 and 4.

Figure 3:
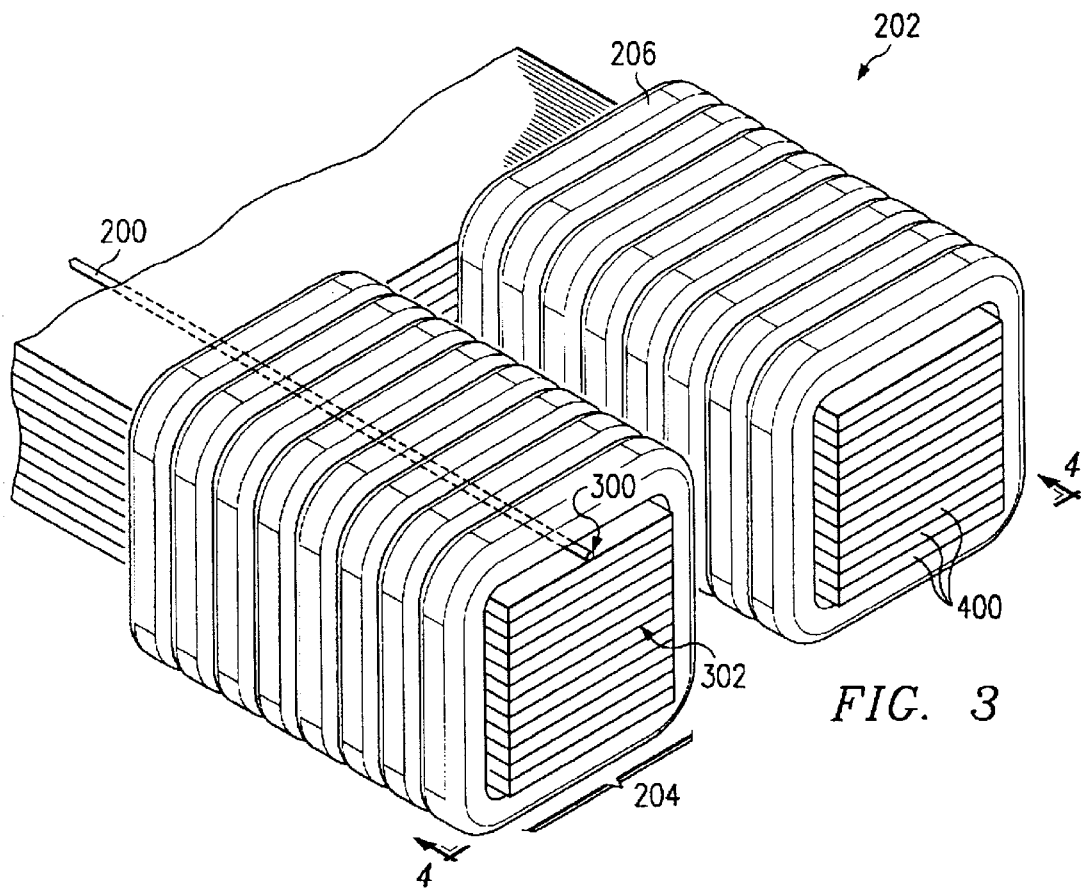
FIG. 3 illustrates a fiber optic strain gage coupled to a pole of a magnet according to one embodiment of the present invention.

FIG. 3 illustrates fiber optic strain gage 200 coupled to an outside surface of pole 204 of magnet 202. In one embodiment, fiber optic strain gage 200 is coupled to an outside surface of pole 204 with an epoxy; however, other suitable methods of coupling fiber optic strain gage 200 to an outside surface of pole 204 may be utilized. Fiber optic strain gage 200 is coupled to an outside surface of pole 204 such that a sensing end 300 of fiber optic strain gage 200 is disposed proximate an end 302 of pole 204. In other embodiments, fiber optic strain gage 200 is coupled to an outside surface of pole 204 such that sensing end 300 of fiber optic strain gage 200 is not proximate end 302, although placement of fiber optic strain gage 200 proximate end 302 generally provides better results.

Figure 4:
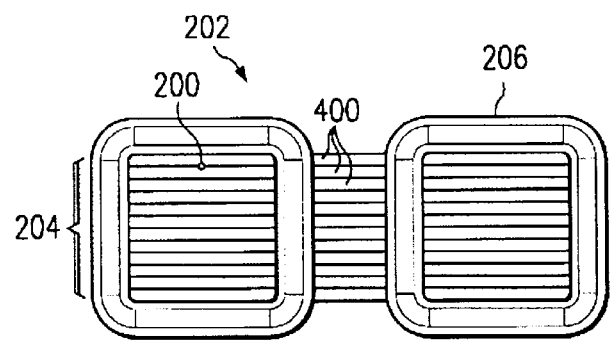
FIG. 4 is an end view of the magnet of FIG. 3 showing the fiber optic strain gage embedded in the pole of the magnet.

FIG. 4 is an end view of magnet 202 showing fiber optic strain gage 200 embedded within pole 204 of magnet 202. Fiber optic strain gage 200 may be embedded within pole 204 in any suitable manner. As shown in FIG. 4, a typical magnet 202 of magnetic bearing 102 is constructed from a plurality of laminated metal plates 400. In the illustrated embodiment, fiber optic strain gage 200 is embedded between two metal plates 400. In addition, fiber optic strain gage 200 may be embedded within pole 204 in any suitable location. One reason to have fiber optic strain gage 200 embedded within pole 204 is to protect fiber optic strain gage 200 from exposure so that it possesses a longer service life. Other alternative embodiments of coupling fiber optic strain gage 200 to pole 204 may be utilized.

Figure 5:
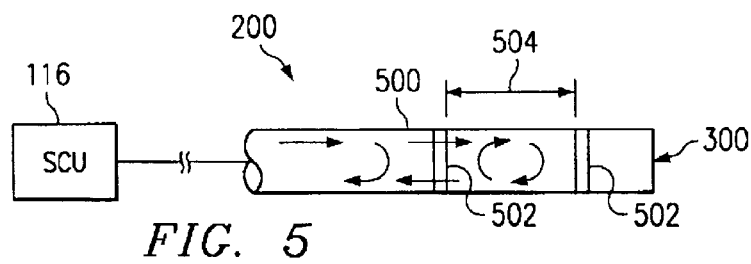
FIG. 5 is an elevation view of a fiber optic strain gage according to one embodiment of the present invention.

FIG. 5 is an elevation view of one embodiment of fiber optic strain gage 200. In the illustrated embodiment, fiber optic strain gage 200 is a fiber Fabry-Perot interferometer ("FFPI"); however, other suitable fiber optic strain gages 200 that include an optical fiber may be utilized. The principles of FFPI's are described in U.S. Pat. No. 5,557, 406, which is incorporated herein by reference. Fiber optic strain gages 200 may or may not utilize temperature compensation.

Fiber optic strain gages are well known in the art of sensing and are not described in detail herein. Generally, fiber optic strain gage 200 includes an optical fiber 500 coupled at one end to signal conditioning unit 116, which typically includes various optoelectronics, power supplies, and digital signal processing capabilities. Signal conditioning unit 116 includes a laser source (e.g., a laser diode) that sends light down optical fiber 500, where portions of the light are reflected back through two internal reflectors 502 placed a distance 504 apart. The reflected portions of the light are guided to a photodetector housed in signal conditioning unit 116 for the purpose of detecting a phase shift (typically represented by a voltage) between the reflected portions A phase shift between the reflected portions is a function of the distance between internal reflectors 502. By measuring the phase shift using interferometry, optical fiber's 500 tension or compression may be accurately determined. As a result, the amount of strain that pole 204 experiences may be measured, and this strain may be converted to a force via any suitable method. Using laser generated light avoids any electromagnetic interference ("EMI") that may otherwise be encountered from large coil currents.

Optical fiber 500 is any suitable optical fiber that transmits light. In one embodiment, optical fiber 500 is approximately 0.005 inches in diameter; however, other diameters may be utilized. Distance 504 between internal reflectors 502 is typically a few millimeters to a few centimeters; however, distance 504 may be any suitable distance. In a particular embodiment, distance 504 is approximately 0.5 inches.

A number of technical advantages result from utilizing fiber optic strain gages 200 to measure dynamic loads in magnetic bearing 102. One particular technical advantage is that fiber optic strain gages 200 may be used to measure very low strains in magnetic bearings 102 associated with rotordynamic system 100, which conventional strain gages cannot. Accordingly, fiber optic strain gages 200 may be use to obtain a transfer function of rotordynamic system 100, which considerably reduces the tuning requirements of rotordynamic system 100.

Figure 6:
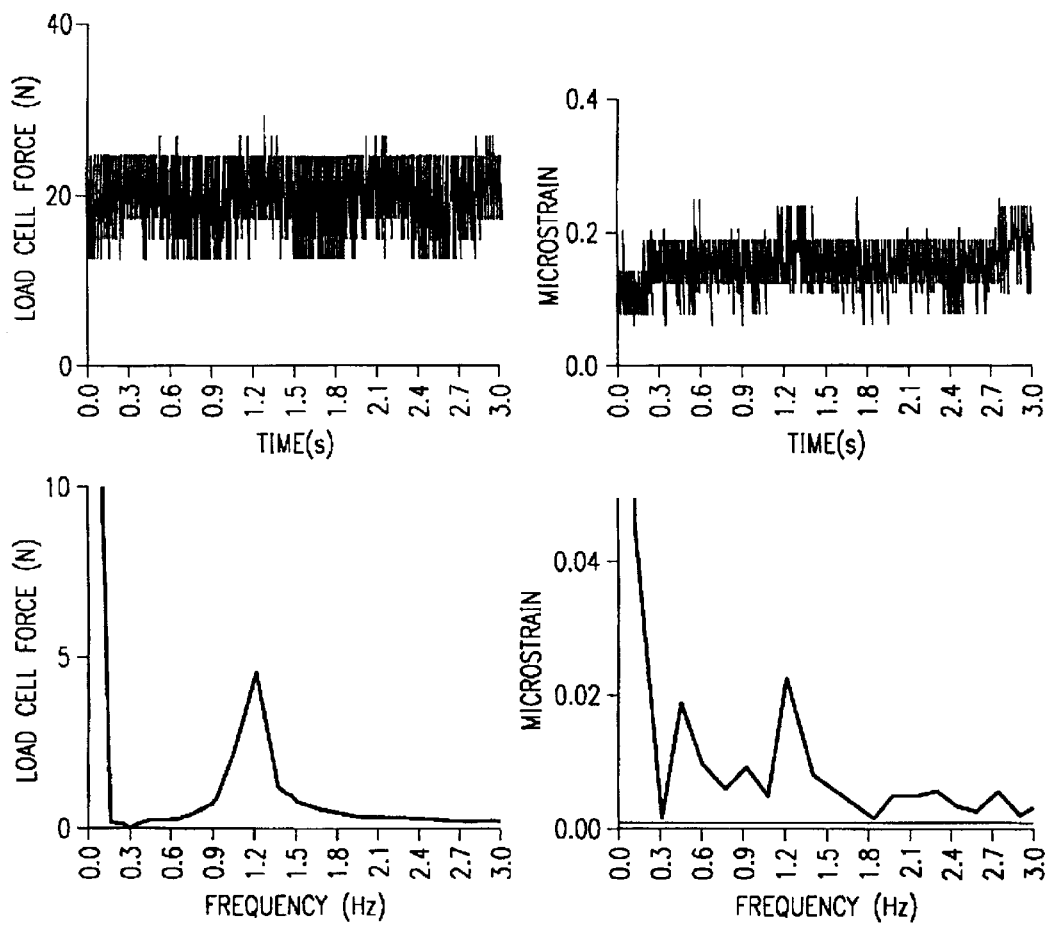
FIG. 6 illustrates example time and domain frequency plots of an input force versus strain at one pole of a magnet of a magnetic bearing.

FIG. 6 shows example time and domain frequency plots of an input force and strain at one pole 204 of magnet 202. The signals shown in these plots were produced by bouncing an 11 kilogram mass supported by a spring at the midspan of rotor 106. The amplitude of the peak in the force spectrum gives the peak-to-peak force at magnetic bearing 102 for this time period. The raw signal from fiber optic strain gage 200 does not show any appreciable change other than the usual noise and jumps. However, the frequency spectrum of the same signal clearly shows a peak at the same frequency as the input force. Fourier analysis of the raw signal produces a much finer resolution of the reaction force.

Figure 7:
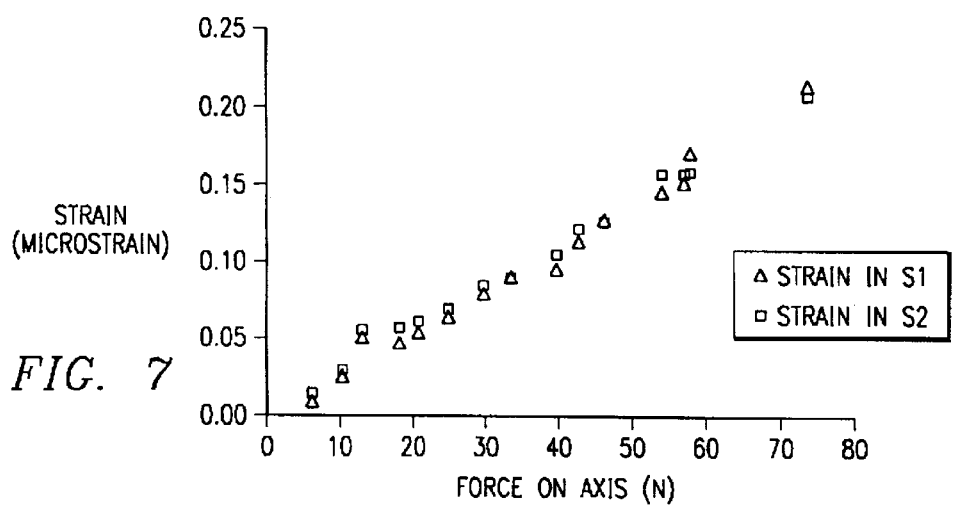
FIG. 7 is an example plot of strain versus input force for four different mass and spring combinations.

FIG. 7 is an example plot of strain versus input force for four different mass and spring combinations. The tests that generated the data illustrated in FIG. 7 were performed as follows. Four different mass and spring combinations were used, thereby defining four distinct frequencies. For each frequency, several different amplitudes of motion were used. The force that resulted from the bouncing mass was transferred through a load cell and applied to rotor 106 at the midspan of two magnetic bearings 102. The data represent the range of forces over a range of frequencies, with each frequency set containing the maximum and minimum force that could be generated, as well as two intermediate loads. Because the frequencies of the isolations were low, and the difference between the separate frequencies small, data were taken for seven seconds per test sampled at 10 kilohertz to provide the number of data points that would allow for adequate resolution in the frequency domain. For these tests, the number of data points used was 65,536. This provided a frequency resolution of 0.153 hertz. The results illustrate the relationship between force and strain that emerged from these tests. As illustrated, the relationship is linear and fiber optic strain gages 200 show a remarkable ability to measure very small forces.

Figure 8:
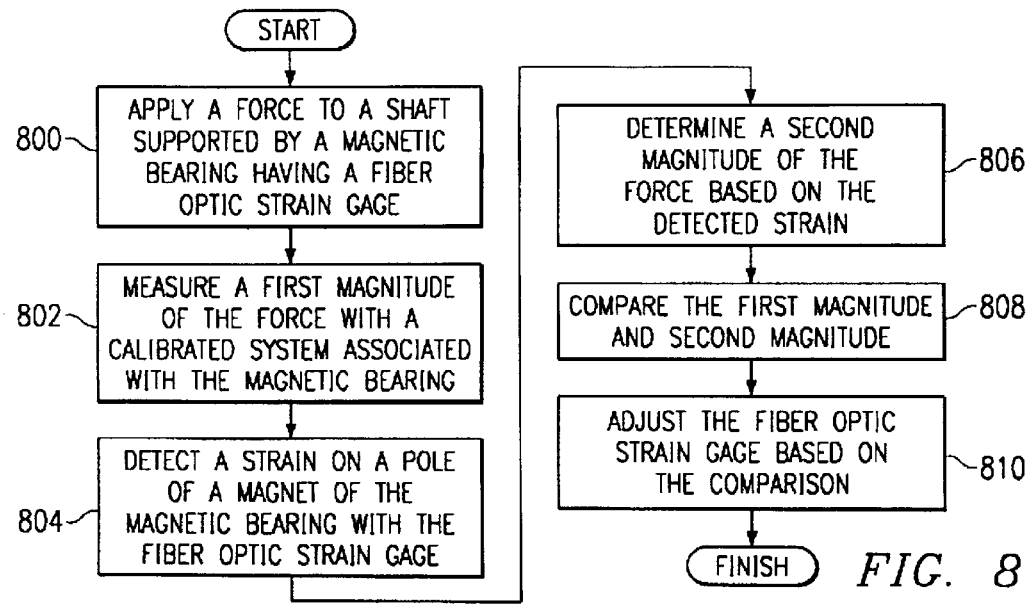
FIG. 8 is a flow chart of a method for calibrating a fiber optic strain gage according to one embodiment of the present invention.

A method of calibrating fiber optic strain gages 200 is described below in conjunction with FIG. 8. FIG. 8 is a flow chart of a method for calibrating fiber optic strain gage 200 according to one embodiment of the present invention. At step 800, a force is applied to rotor 106, which is supported by a magnetic bearing 102 having at least one fiber optic strain gage 200. In one embodiment, the force is applied to rotor 106 at a generally low frequency. A generally low frequency is defined herein to be any frequency equal to or less than 50 hertz. In a particular embodiment, the force is applied to rotor 106 at a frequency between approximately 1 and 5 hertz. The force that is applied to rotor 106 may be applied in any suitable manner. In one embodiment, an error signal may be introduced into controller 112 of magnetic bearing 102 to "fool" magnetic bearing 102 into thinking that rotor 106 has an undesirable position. Controller 112 then compensates for this error signal by increasing or decreasing the current in one of the magnets 202, thereby producing a force on rotor 106. In another embodiment, a load cell may be utilized to apply force to rotor 106.

A first magnitude of the force applied at step 800 is measured at step 802 with a calibrated system associated with magnetic bearing 102. In one embodiment, the calibrated system is controller 112 of magnetic bearing 102; however, other suitable calibrated systems may be used to measure a first magnitude of the force, such as a calibrated load cell.

At step 804, a strain on pole 204 of magnet 202 is detected by fiber optic strain gage 200. Based on this detected strain, a second magnitude of the force applied to rotor 106 is determined at step 806. The second magnitude may be determined in any suitable manner. For example, signal conditioning unit 116 of fiber optic strain gage 200 may be coupled to a computer having appropriate logic for the purpose of determining of the second magnitude of the force.

After measuring the first magnitude of the force and determining the second magnitude of the force, the first magnitude of the force and the second magnitude of the force are compared at step 808. The comparison at step 808 above may be carried out in any suitable manner. For example, a fast Fourier transfer may be used to produce Fourier transforms of the signals netting force signals $F(j\omega)$ and strain signals $S(j\omega)$. The transfer function $G(j\omega)=S(j\omega)/F(j\omega)$ shows constant peaks at the input frequencies, and the magnitudes of these peaks provides the calibration factor for fiber optic strain gauge 200. Based on the comparison at step 808, fiber optic strain gage 200 is adjusted at step 810, thereby ending one method of calibrating fiber optic strain gage 200.

Although embodiments of the invention and their advantages are described in detail, a person skilled in the art could make various alterations, additions, and omissions without departing from the spirit and scope of the present invention as defined by the appended claims.

What is claimed is:

1. A system for measuring dynamic loads in a rotordynamic system having a rotor, comprising:
    a magnetic bearing disposed around the rotor and having a plurality of magnets; and
    at least one fiber optic strain gage associated with a pole of a respective one of the plurality of magnets, the fiber optic strain gage operable to detect a strain on the pole resulting from the dynamic loads.

2. The system of claim 1, wherein a first end of the fiber optic strain gage is disposed proximate an end of the pole proximate the rotor.

3. The system of claim 1, wherein the fiber optic strain gage is coupled to an outside surface of the pole.

4. The system of claim 1, wherein the fiber optic strain gage is disposed within the pole.

5. The system of claim 1, wherein the at least one fiber optic strain gage comprises two fiber optic strain gages associated with poles of two of the magnets, the two fiber optic strain gages oriented, with respect to the rotor, approximately ninety degrees from one another.

6. The system of claim 1, wherein the at least one fiber optic strain gage comprises four fiber optic strain gages associated with poles of four of the magnets, the four fiber optic strain gages oriented, with respect to the rotor, approximately ninety degrees from one another.

7. The system of claim 1, wherein the at least one fiber optic strain gage comprises three fiber optic strain gages associated with poles of three of the magnets, the three fiber optic strain gages oriented, with respect to the rotor, approximately 120 degrees from one another.

8. A system for measuring dynamic loads in a rotordynamic system having a rotor, comprising:
   a magnetic bearing disposed around the rotor and having a plurality of magnets, each magnet having two poles and formed from a plurality of metal plates;
   a first fiber optic strain gage disposed within a pole of a first magnet such that an end of the first fiber optic strain gage is proximate an end of the pole of the first magnet;
   a second fiber optic strain gage disposed within a pole of a second magnet such that an end of the second fiber optic strain gage is proximate an end of the pole of the second magnet, the second fiber optic strain gage oriented approximately ninety degrees from the first fiber optic strain gage with respect to the rotor; and
   wherein the first and second fiber optic strain gages are operable to detect first and second strains on their respective poles resulting from the dynamic loads.

9. The system of claim 8, further comprising:
   a third fiber optic strain gage disposed within a pole of a third magnet such that an end of the third fiber optic strain gage is proximate an end of the pole of the third magnet, the third fiber optic strain gage oriented approximately 180 degrees from the first fiber optic strain gage with respect to the rotor; and
   a fourth fiber optic strain gage disposed within a pole of a fourth magnet such that an end of the fourth fiber optic strain gage is proximate an end of the pole of the fourth magnet, the fourth fiber optic strain gage oriented approximately 180 degrees from the second fiber optic strain gage with respect to the rotor.

10. The system of claim 8, further comprising a third fiber optic strain gage disposed within a pole of a third magnet such that an end of the third fiber optic strain gage is proximate an end of the pole of the third magnet, and wherein the first, second, and third fiber optic strain gages are oriented approximately 120 degrees from one another with respect to the rotor.

11. A method for measuring dynamic loads in a rotordynamic system having a rotor, comprising:
   disposing a magnetic bearing around the rotor, the magnetic bearing having a plurality of magnets;
   associating at least one fiber optic strain gage with a pole of a respective one of the plurality of magnets; and
   detecting, via the fiber optic strain gage, a strain on the pole resulting from the dynamic loads.

12. The method of claim 11, further comprising disposing a first end of the fiber optic strain gage proximate an end of the pole proximate the rotor.

13. The method of claim 11, further comprising coupling the fiber optic strain gage to an outside surface of the pole.

14. The method of claim 11, further comprising disposing the fiber optic strain gage within the pole.

15. The method of claim 11, wherein associating the at least one fiber optic strain gage with the pole of the respective one of the plurality of magnets comprises:
   associating two fiber optic strain gages with poles of two of the magnets; and
   orienting, with respect to the rotor, the two fiber optic strain gages approximately ninety degrees from one another.

16. The method of claim 11, wherein associating the at least one fiber optic strain gage with the pole of the respective one of the plurality of magnets comprises:
   associating four fiber optic strain gages with poles of four of the magnets; and
   orienting, with respect to the rotor, the four fiber optic strain gages approximately ninety degrees from one another.

17. The method of claim 11, wherein associating the at least one fiber optic strain gage with the pole of the respective one of the plurality of magnets comprises:
   associating three fiber optic strain gages with poles of three of the magnets; and
   orienting, with respect to the rotor, the three fiber optic strain gages approximately 120 degrees from one another.

18. A method for measuring dynamic loads in a rotordynamic system having a rotor, comprising:
   disposing a magnetic bearing around the rotor, the magnetic bearing having a plurality of magnets, each magnet having two poles and formed from a plurality of metal plates;
   disposing a first fiber optic strain gage within a pole of a first magnet such that an end of the first fiber optic strain gage is proximate an end of the pole of the first magnet;
   disposing a second fiber optic strain gage within a pole of a second magnet such that an end of the second fiber optic strain gage is proximate an end of the pole of the second magnet;
   orienting, with respect to the rotor, the second fiber optic strain gage approximately ninety degrees from the first fiber optic strain gage; and
   detecting, via the first and second fiber optic strain gages, first and second strains on their respective poles resulting from the dynamic loads.

19. The method of claim 18, further comprising:
   disposing a third fiber optic strain gage within a pole of a third magnet such that an end of the third fiber optic strain gage is proximate an end of the pole of the third magnet;
   orienting the third fiber optic strain gage approximately 180 degrees from the first fiber optic strain gage with respect to the rotor;
   disposing a fourth fiber optic strain gage within a pole of a fourth magnet such that an end of the fourth fiber optic strain gage is proximate an end of the pole of the fourth magnet; and
   orienting the fourth fiber optic strain gage approximately 180 degrees from the second fiber optic strain gage with respect to the rotor.

20. The method of claim 18, further comprising:
   disposing a third fiber optic strain gage within a pole of a third magnet such that an end of the third fiber optic strain gage is proximate an end of the pole of the third magnet; and
   orienting the first, second, and third fiber optic strain gages approximately 120 degrees from one another with respect to the rotor.

21. A method for calibrating a fiber optic strain gage associated with a magnetic bearing supporting a shaft, the method comprising:

applying a force to the shaft;

measuring a first magnitude of the force with a calibrated system associated with the magnetic bearing;

detecting a strain on a pole of a magnet of the magnetic bearing with the fiber optic strain gage;

determining a second magnitude of the force based on the detected strain;

comparing the first magnitude and the second magnitude; and adjusting the fiber optic strain gage based on the comparison.

22. The method of claim 21, wherein applying the force to the shaft comprises applying the force to the shaft at a generally low frequency.

23. The method of claim 22, wherein applying the force to the shaft at the generally low frequency comprises applying the force to the shaft at a frequency between approximately one and five hertz.

24. The method of claim 21, wherein applying the force to the shaft comprises inputting an error signal into a controller associated with the magnetic bearing.

25. The method of claim 21, wherein measuring the first magnitude of the force with the calibrated system associated with the magnetic bearing comprises measuring the first magnitude of the force with a calibrated load cell associated with the magnetic bearing.

26. The method of claim 21, wherein comparing the first magnitude and the second magnitude comprises producing a transfer function by utilizing Fourier transforms.

* * * * *